United States Patent [19]

Ullrich

[11] 4,104,999
[45] Aug. 8, 1978

[54] AFTER-COOLER ACCESSORY UNIT FOR INTERNAL COMBUSTION ENGINE HAVING A CARBURETOR

[76] Inventor: Robert L. Ullrich, P. O. Box 899, Roswell, N. Mex. 88201

[21] Appl. No.: 785,890

[22] Filed: Apr. 8, 1977

[51] Int. Cl.$^2$ ............................................. F02B 29/04
[52] U.S. Cl. .............................. 123/119 CD; 60/599; 261/DIG. 51
[58] Field of Search ................... 123/119 C, 119 CD; 60/605, 599; 261/DIG. 51, 30

[56] References Cited

U.S. PATENT DOCUMENTS

| | | | |
|---|---|---|---|
| 1,413,420 | 4/1922 | Moss | 60/605 |
| 2,362,493 | 11/1944 | Lowther | 123/119 C |
| 2,839,038 | 6/1958 | Middlebrooks | 123/119 C |
| 3,881,455 | 5/1975 | Belsanti | 123/119 C |

*Primary Examiner*—Ronald H. Lazarus
*Attorney, Agent, or Firm*—Sughrue, Rothwell, Mion, Zinn and Macpeak

[57] ABSTRACT

A "hang-on" after-cooler accessory unit adapted to be mounted on an existing supercharged internal combustion engine having a carburetor supplied with natural gas fuel. The unit is mounted on an existing engine by removing the engine carburetor from the intake manifold, placing the unit over the carburetor mounting studs on the intake manifold, replacing the carburetor over the mounting studs and inside the unit, creating an air-tight seal between the unit and the carburetor, and connecting the inlet of the unit to the discharge port of the engine supercharger. The unit includes a water-cooled radiator or heat exchanger through which the supercharged air passes on the way to the carburetor air intake. The accessory unit is designed to be easily mountable on any internal combustion engine of the carburetor type and greatly increases the efficiency of engine operation because of the resultant cooling of the supercharged air.

10 Claims, 6 Drawing Figures

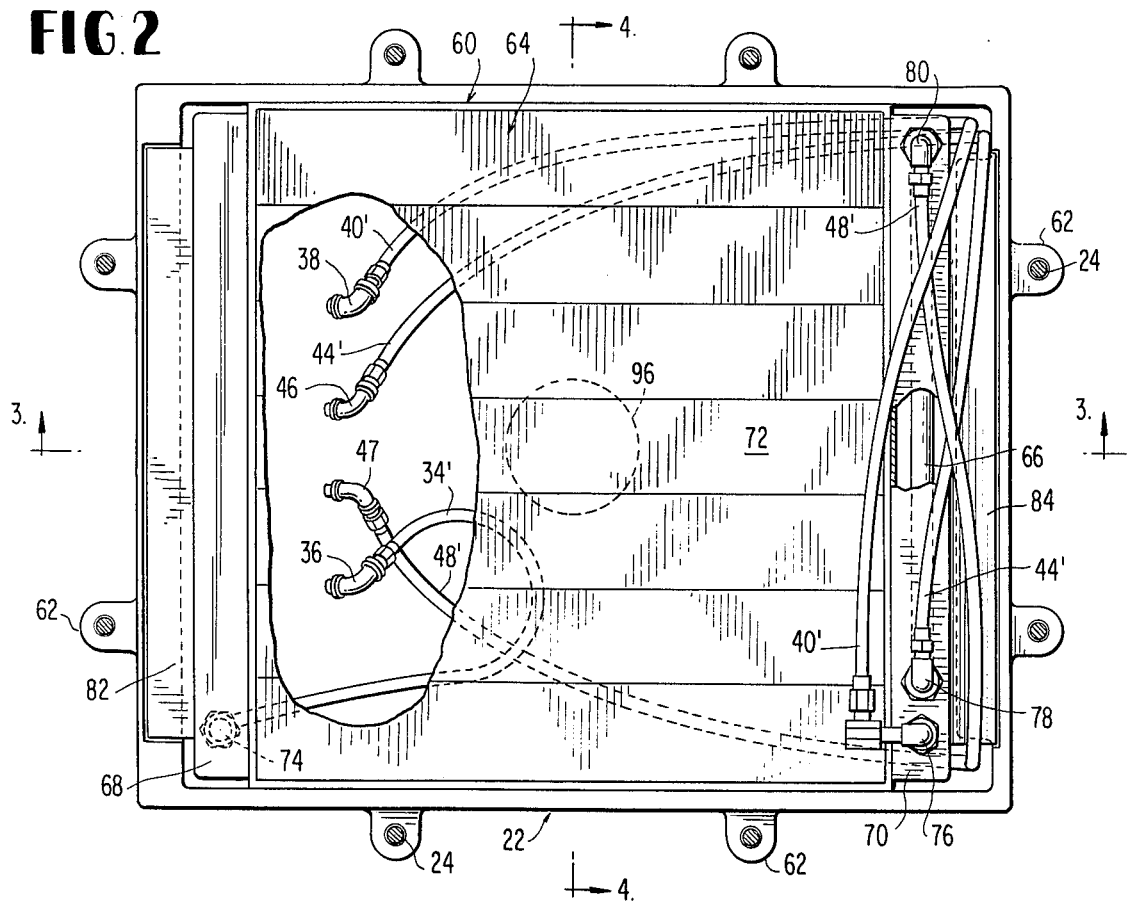
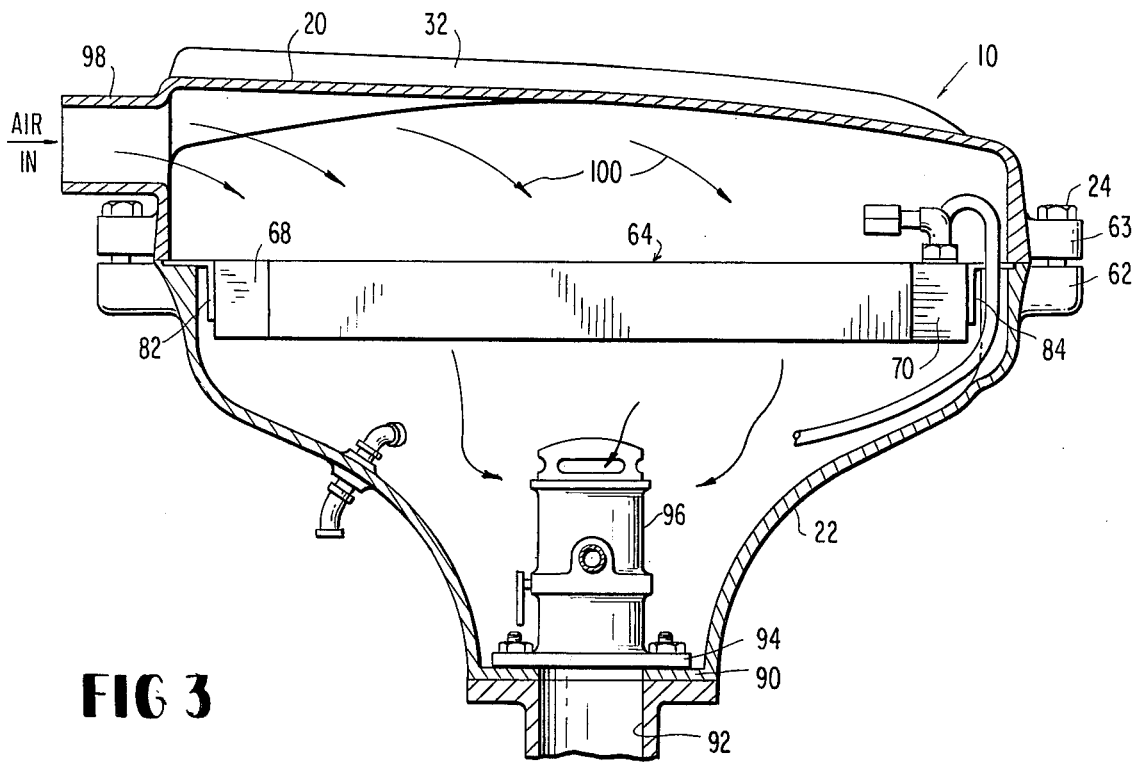

4,104,999

AFTER-COOLER ACCESSORY UNIT FOR INTERNAL COMBUSTION ENGINE HAVING A CARBURETOR

BACKGROUND OF THE INVENTION

1. Field of the Invention

This invention relates to the field of after-coolers for supercharged internal combustion engines, and, more particularly, to an after-cooler accessory unit designed to be mounted on an existing supercharged internal combustion engine having a carburetor.

2. Description of the Prior Art

After-coolers for supercharged internal combustion engines are broadly known in the prior art. However, all such after-coolers of which I am aware, are designed for use with fuel injection engines wherein the cooled air is discharged directly into the intake manifold of the engine, and/or the after-cooler is made integral with the engine at the time of manufacture of the engine, with the heat exchanger of the after-cooler often being mounted directly within the intake manifold.

However, there are presently used in industrial and farm applications a large number of converted automobile engines of the carburetor-type wherein the carburetor has been converted to operate on natural gas fuel and having a supercharger which compresses the air supplied to the carburetor air intake. However, in passing through the supercharger, the temperature of the air is elevated to such a degree that the amount of oxygen in a given volume of air supplied to the carburetor is greatly reduced, thereby resulting in reduced efficiency of engine operation.

SUMMARY OF THE INVENTION

The primary object of this invention is to provide an after-cooler in the form of an accessory unit which may be easily mounted on a supercharged internal combustion engine of the carburetor type in order to cool the supercharged air supplied to the carburetor.

Another object of the invention is to provide such an accessory unit which is relatively inexpensive and which is easy to attach to a conventional internal combustion engine having a supercharger.

BRIEF DESCRIPTION OF THE DRAWING

FIG. 2 is a partially broken-away top view of my accessory unit.

FIG. 3 is a cross-sectional view taken along line 3—3 of FIG. 2.

DESCRIPTION OF THE PREFERRED EMBODIMENT

Figure 1:
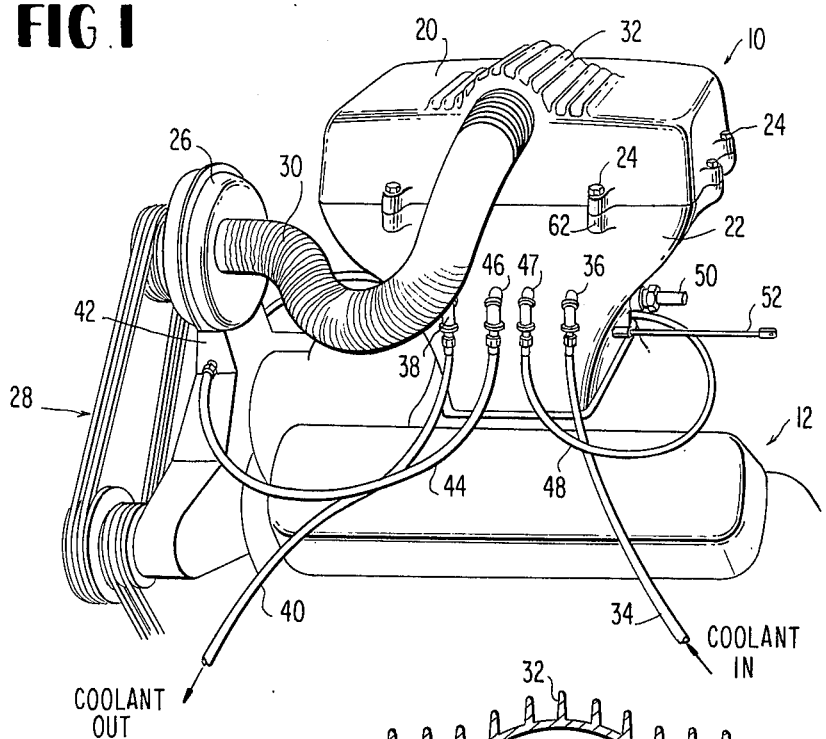
FIG. 1 is a perspective view showing the location of my after-cooler accessory unit when installed on a V-8 engine.

FIG. 1 shows a preferred embodiment of my invention in the form of an after-cooler accessory unit 10 mounted on a conventional V-8 engine 12 having installed thereon a natural gas carburetor. The unit 10 is mounted over the carburetor which in turn is mounted on the intake manifold. The unit 10 consists of an upper cover section 20 and a base section 22, the two sections being fastened together by bolts 24.

Also mounted on the engine is a supercharger or air compressor 26 which is driven by a belt and pulley system 28 which in turn is driven by the engine. The supercharged or compressed air discharged by the supercharger is conducted via a flexible hose 30 connected to the inlet in the cover section 20 of the unit 10.

The unit 10 is preferably made of cast aluminum and has cooling ribs 32 formed on the top of the cover section 20.

A coolant, such as water, is pumped through a flexible input hose 34 to an input coupling 36 mounted on the side of the base section 22. The coolant circulates through a heat exchanger inside the unit 10 and is discharged through an outlet coupling 38 and a flexible hose 40.

The coolant may be supplied by either an open end system or a closed, recirculating system. For example, when the engine is used on a farm where there is an abundance of water for irrigation, water may be pumped into the inlet hose 34 and merely discharged onto the ground from the outlet hose 40. On the other hand, the inlet and outlet hoses may be connected in circuit with the conventional radiator cooling system of the engine, in which case a closed system is formed wherein the hot water from the after-cooler is passed through the engine radiator, cooled, and then returned to the after-cooler.

Supercharger 26 includes an oil reservoir 42. During operation of the supercharger, the oil becomes hot, thereby further elevating the temperature of the compressed air discharged via the supercharger. As described in more detail below, the supercharger oil can also be circulated through the after-cooler to cool the oil, thereby reducing the temperature of the air discharged via the supercharger. The supercharger oil is passed via a flexible input hose 44 and an input coupling 46, mounted in the side of the base section 22, into the after-cooler unit 10. The cooled oil returns to the oil reservoir 42 via an outlet coupling 47 and a flexible outlet hose 48. The supercharger oil is cooled in the unit 10 by a separate heat exchanger, as will be described below.

An inlet pipe 50 supplies the natural gas to the carburetor inside the unit 10, and a rod 52 passes through the sides of the unit to operate the carburetor throttle.

FIG. 2 is a plan view of the heat exchanger assembly 60 which is mounted within the after-cooler accessory unit 10 by means of the bolts 24 which pass through flanges 62 and 63 projecting from the four edges of the bottom and cover sections, respectively.

The heat exchanger assembly includes two heat exchanger units: first, a conventional automobile radiator core 64 for cooling the supercharger air; and second, a single pipe heat exchanger unit 66, such as a conventional automobile transmission oil cooler, for cooling the supercharger oil.

Figure 4:
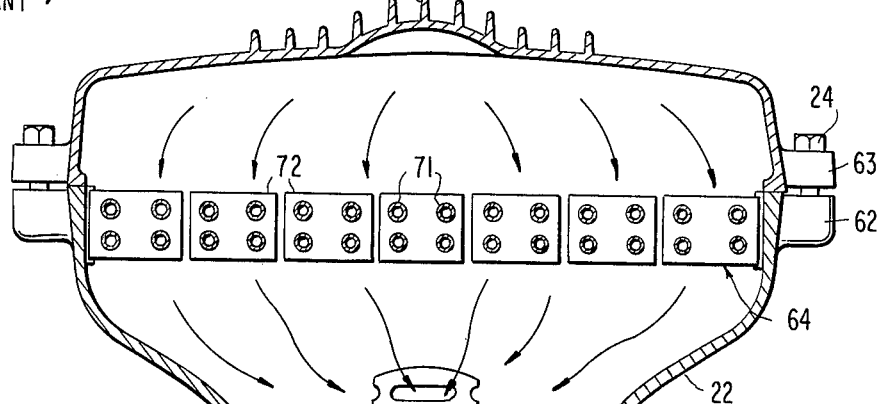
FIG. 4 is a cross-sectional view taken along line 4—4 of FIG. 2.

As also shown in FIGS. 3 and 4, the radiator core consists of an inlet tank 68, and an outlet tank 70. Coolant flows through the inlet tank through a plurality of pipes 71 to the outlet tank. The pipes pass through cooling fins 72.

The coolant inlet coupling 36 is connected inside the unit 10 to another flexible hose 34' which is connected to the inlet 74 of the tank 68. The coolant outlet coupling 38 is connected via an interior flexible hose 40' to the outlet 76 of the radiator core tank 70. Consequently, the path of the coolant is as follows: inlet hose 34, inlet coupling 36, interior hose 34', radiator inlet 74, inlet tank 68, through the radiator core 64, outlet tank 70, outlet 76, interior hose 40', outlet coupling 38, and outlet hose 40.

The auxiliary heat exchanger unit 66 is in the form of a copper tube located in the radiator outlet tank 70. One end of this tube is connected via an inlet coupling 78, which is connected to one end of an interior flexible hose 44' whose other end is connected to the inlet coupling 46 mounted in the base section 22 of the unit 10. The other end of the tube 66 is connected via an outlet coupling 80 to another interior flexible hose 48' whose other end is connected to the outlet coupling 47 mounted in the base section 22. Therefore, the supercharger oil is cooled by flowing through the inlet coupling 46, hose 44', the single tube heat exchanger 66, hose 48', outlet coupling 47, and hose 48 back to the supercharger oil reservoir. The heat exchanger assembly 60 may be mounted in the unit 10 by, for example, means of flanges 82 and 84 welded to the radiator tanks 68 and 70 and clamped between the cover section 20 and bottom section 22 of the unit 10.

Figures 5, 6:
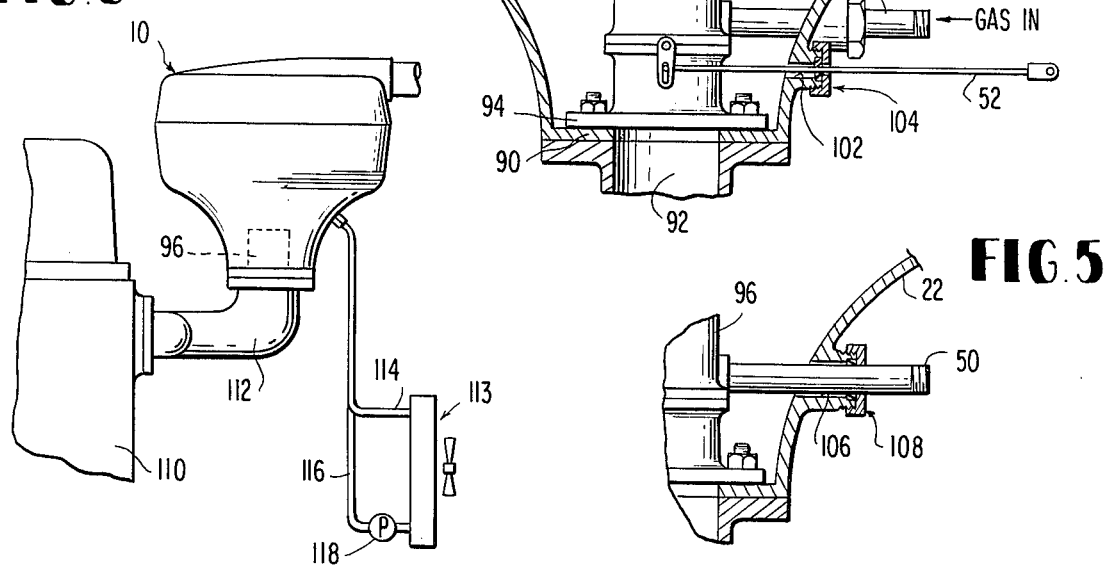
FIG. 5 is a cross-sectional view of a portion of FIG. 4.
FIG. 6 is a diagrammatic view showing my after-cooler accessory unit mounted on an in-line six cylinder engine.

FIGS. 3, 4 and 5 show more clearly the manner in which the after-cooler accessory unit 10 is mounted on the engine with respect to the carburetor. The base section 22 has an inwardly extending flange 90 which fits between the top of the intake manifold 92 and the base 94 of the natural gas carburetor 96. When the carburetor nuts are tightened, the accessory unit 10 is then securely attached to the engine. The compressed air from the supercharger 26 is conducted via the flexible hose 30 to the air inlet 98 in the cover section 20 of the unit 10. As indicated by the arrows 100, the relatively hot compressed air flows downwardly through the radiator core 64 and into the top of the carburetor 96 where it is mixed with the natural gas supplied by the gas inlet pipe 50. The resultant gas-air mixture then passes into the intake manifold 92. Since the air has been substantially cooled by the heat exchanger, the resulting engine efficiency is greatly increased as compared to an engine without such an accessory unit.

Since it is desirable that the accessory unit 10 be as airtight as possible, the hole 102 through which the throttle rod 52 passes is sealed by a compression nut and O-ring assembly 104. Similarly, the hole 106 through which the gas inlet pipe 50 passes is also sealed by a nut and O-ring assembly 108.

To mount the after-cooler accessory unit 10 on the engine 12, the carburetor is first removed from its mounting studs or bolts surrounding the intake manifold opening, and these studs or bolts are replaced with longer ones. The base section is then installed over the intake manifold by placing the corresponding openings in the flange 90 of the base section 22 over the studs. Gaskets are placed between the flange 90 and the carburetor and manifold. The carburetor is replaced, and the carburetor and unit 10 are then secured by tightening the nuts on the studs.

The gas fuel line 50 is then inserted through the opening 106, and the compression nut and O-ring assembly 108 is installed to create an airtight seal around the opening. This same procedure is followed with respect to the throttle rod 52.

The heat exchanger assembly 60 is then installed on the exposed upper surfaces of the base section 22, and the interior hoses are connected to the heat exchanger assembly. The cover section 20 is then installed, and the bolts 24 are tightened to clamp the heat exchanger assembly in position.

Furthermore, an auxiliary supercharger oil circulating pump may be inserted in series in the oil flow path to aid in the circulation of the supercharger oil through the heat exchanger unit 66.

FIG. 6 shows one manner in which the accessory unit 10 may be mounted on a six-cylinder engine 110. The carburetor is removed from the engine, and an intake manifold adapter 112 is fixed at one end to the engine intake mainfold. On the other end of the adapter, the unit 10 and carburetor 96 are installed as described above. FIG. 10 also shows a closed recirculating coolant system combined with the engine radiator assembly 113. That is, the after-cooler coolant is recirculated by hoses 114 and 116 through the radiator assembly 113 by the water pump 118.

I claim:

1. An after-cooler accessory unit for an internal combustion engine having a supercharger for compressing ambient air and discharging the compressed air through a discharge port to the carburetor of the engine, said unit comprising:

a housing adapted to enclose the carburetor of the engine and having an air inlet and an air outlet;

means for coupling said inlet to the discharge port of the supercharger;

means for securing said housing to the engine and sealing said outlet of said housing to the air intake of the carburetor; and heat exchanger means mounted in said housing in the path of the compressed air for cooling the compressed air received from the supercharger.

2. The after-cooler accessory unit as defined in claim 1 wherein said inlet is located at the top of said housing and said heat exchanger means is located between said inlet and a lower point of said housing, said lower point being above the top of the carburetor when said housing is secured to the engine.

3. The after-cooler accessory unit as defined in claim 2 further comprising conduit means for passing a liquid coolant through said heat exchanger means.

4. The after-cooler accessory unit as defined in claim 3 wherein said housing comprises separate top cover and base sections, said air inlet being in said cover section and said air outlet being in said base section; said heat exchanger means being mounted on the top of said base section; and means for clamping said heat exchanger means between said cover and base sections.

5. The after-cooler accessory unit as defined in claim 4 wherein said conduit means comprises coolant inlet and outlet couplings mounted in, and projecting through, the wall of said base section, interior coolant conduits connecting the interior ends of said inlet and outlet couplings to opposite ends of said heat exchanger means, an exterior coolant inlet conduit connected to the exterior end of said coolant inlet coupling for supplying coolant to said heat exchanger means, and an exterior outlet conduit connected to the exterior end of said coolant outlet coupling for removing coolant from said heat exchanger means.

6. The after-cooler accessory unit as defined in claim 4 wherein said base section has a first opening therein for permitting the carburetor fuel line to pass therethrough, and further comprising means for forming an air-tight seal between said opening and the fuel line when the housing is secured to the engine.

7. The after-cooler accessory unit as defined in claim 6 wherein said base section has a second opening therein for permitting the carburetor throttle rod to pass therethrough, and further comprising means for forming an air-tight seal between said second opening and the throttle rod when the housing is secured to the engine.

8. The after-cooler accessory unit as defined in claim 1 wherein said heat exchanger means comprises a first heat exchanger unit for cooling the compressed air and a second heat exchanger unit for cooling the oil in the supercharger, and conduit means for circulating the supercharger oil through said second heat exchanger unit.

9. The after-cooler accessory unit as defined in claim 8 wherein said first heat exchanger unit is a conventional automobile radiator having a core and inlet and outlet collecting tanks, and wherein said second heat exchanger unit is located in said outlet collecting tank.

10. A method of installing the after-cooler accessory unit defined in claim 4 on an internal combustion engine manufactured with an integral supercharger but having no after-cooler, and having a carburetor with a fuel line and a throttle rod, said method comprising the steps of:
  removing the fuel line and throttle rod from the carburetor;
  removing the carburetor from the intake manifold of the engine;
  replacing the carburetor hold-down studs with longer studs;
  placing said base section over the intake manifold so that the longer studs protrude upwardly through stud openings in the base section;
  replacing the carburetor over the longer studs and securing the carburetor and base section to the engine by tightening nuts on the longer studs by means of a torque wrench;
  connecting the fuel line to the carburetor through an opening in the base section, and forming an air-tight seal between the fuel line and the opening;
  connecting the throttle rod through another hole in the base section and forming an air-tight seal between the rod and the opening;
  placing the heat exchanger means on top of the base section;
  placing the cover section on top of the heat exchanger means;
  clamping together the cover section, heat exchanger means and base section;
  connecting the air inlet of the cover section to the discharge of the supercharger; and
  connecting the conduit means to a source of liquid coolant.

* * * * *